(12) United States Patent
Liu

(10) Patent No.: US 12,498,466 B2
(45) Date of Patent: Dec. 16, 2025

(54) SIGNAL LEVEL OF CAPTURED TARGETS

(71) Applicant: AQRONOS, INC., Broomfield, CO (US)

(72) Inventor: Hao Liu, Nanjing (CN)

(73) Assignee: AQRONOS, INC., Broomfield, CO (US)

( * ) Notice: Subject to any disclaimer, the term of this patent is extended or adjusted under 35 U.S.C. 154(b) by 133 days.

(21) Appl. No.: 18/496,101

(22) Filed: Oct. 27, 2023

(65) Prior Publication Data
US 2024/0142586 A1     May 2, 2024

Related U.S. Application Data

(60) Provisional application No. 63/420,439, filed on Oct. 28, 2022.

(51) Int. Cl.
| | | |
|---|---|---|
| *G01S 7/4911* | (2020.01) | |
| *B60W 30/09* | (2012.01) | |
| *G01S 7/4913* | (2020.01) | |
| *G01S 17/931* | (2020.01) | |

(52) U.S. Cl.
CPC ........... *G01S 7/4911* (2013.01); *B60W 30/09* (2013.01); *G01S 7/4913* (2013.01); *G01S 17/931* (2020.01); *B60W 2420/408* (2024.01)

(58) Field of Classification Search
CPC .... G01S 7/4911; G01S 7/4913; G01S 17/931; G01S 17/34; B60W 30/09; B60W 2420/408; B60W 60/0011
See application file for complete search history.

(56) References Cited

U.S. PATENT DOCUMENTS

| | | | |
|---|---|---|---|
| 11,320,522 B1 * | 5/2022 | Avci | ................ G01S 17/58 |
| 11,435,453 B1 * | 9/2022 | Behzadi | ............. G01S 7/4913 |
| 2019/0331797 A1 | 10/2019 | Singer et al. | |
| 2021/0124055 A1 | 4/2021 | Smith et al. | |
| 2021/0181309 A1 | 6/2021 | Oza et al. | |
| 2022/0187458 A1 | 6/2022 | Piggott et al. | |

OTHER PUBLICATIONS

International Search report and Written Opinion of the International Searching Authority for PCT/US2023/078038 mailed Mar. 5, 2024, 13 pages.

\* cited by examiner

*Primary Examiner* — Seung C Sohn
(74) *Attorney, Agent, or Firm* — Sheppard, Mullin, Richter & Hampton LLP; Xin Xie

(57) ABSTRACT

A laser source generates an optical signal. A splitter splits the optical signal into a first signal and a second signal. A first modulator modulates the first signal. A second modulator modulates the second signal. A scanner scans the first signal following the modulation by the first modulator. A coupler combines the modulated second signal and the modulated first signal following the scanning of the first signal. A detector detect an attribute corresponding to the combined modulated second signal and the modulated first signal and captures a target based on the combined modulated second signal and the modulated first signal.

20 Claims, 16 Drawing Sheets

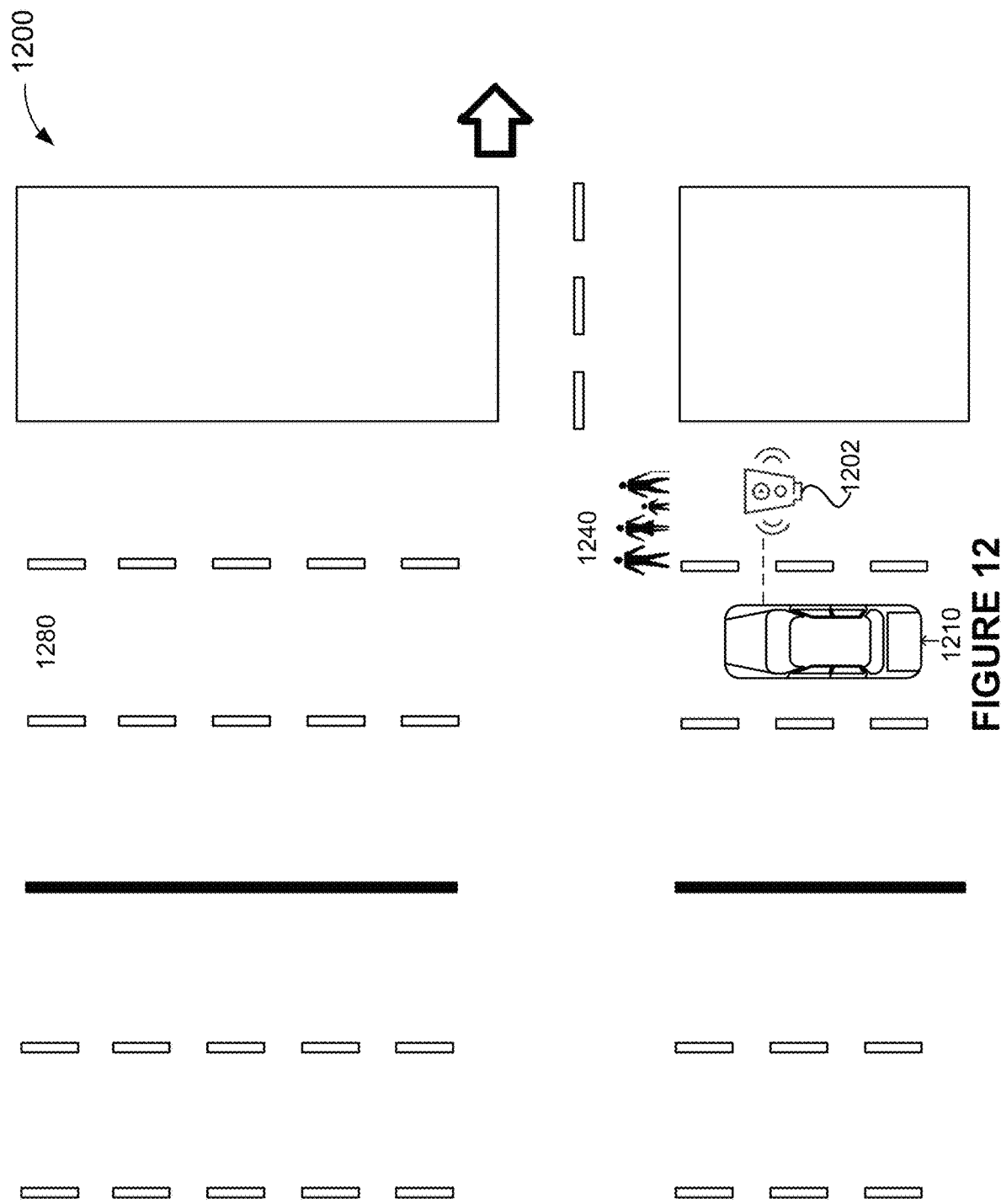

SIGNAL LEVEL OF CAPTURED TARGETS

PRIORITY INFORMATION

This application claims the benefit under 35 U.S.C. 119(e) of U.S. Provisional Application No. 63/420,439, filed Oct. 28, 2022, the content of which is hereby incorporated in its entirety.

FIELD OF THE INVENTION

This disclosure relates to approaches of improving a signal level of captured targets using Lidar.

BACKGROUND

Lidar technology has a cornucopia of applications in fields such as aerospace, autonomous or semi-autonomous driving, and meteorology due to high speed of processing, high precision, and high accuracy.

SUMMARY

Various examples of the present disclosure can include a system comprising: a laser source configured to generate an optical signal; a splitter configured to split the optical signal into a first signal and a second signal; a first modulator configured to modulate the first signal; a second modulator configured to modulate the second signal; a scanner that scans the first signal following the modulation by the first modulator; a coupler that combines the modulated second signal and the modulated first signal following the scanning of the first signal; and a detector configured to detect an attribute corresponding to the combined modulated second signal and the modulated first signal, and capture a target based on the combined modulated second signal and the modulated first signal.

In some examples, the system may further comprise a processor that generates a first frequency modulated continuous wave (FMCW) signal and a second FMCW signal to modulate the first signal and the second signal, respectively.

In some examples, the processor processes the captured target, and determines and executes a navigation action based on the processed target.

In some examples, the navigation action comprises a yielding, a swerving, or a turning action.

In some examples, the second FMCW signal has a delay with respect to the first FMCW signal, and the processor controls a magnitude of the delay.

In some examples, the processor controls the magnitude of the delay based on a distance from the processor to the target.

In some examples, the processor controls the magnitude of the delay to be higher in response to a smaller distance from the processor to the target.

In some examples, the second FMCW signal comprises a reference beat signal that beats with a signal reflected from the target.

In some examples, the system further comprises a first digital-to-analog converter (DAC) that controls the first modulator and a second DAC that controls the second modulator.

In some examples, the system further comprises a field programmable gate array (FPGA) that controls the first DAC and the second DAC.

In some examples, a corresponding method performed by the system and the aforementioned elements thereof comprises generating an optical signal; splitting the optical signal into a first signal and a second signal; modulating the first signal; modulating the second signal; scanning the first signal following the modulation by the first modulator; combining the modulated second signal and the modulated first signal following the scanning of the first signal; detecting an attribute corresponding to the combined modulated second signal and the modulated first signal; and capturing a target based on the combined modulated second signal and the modulated first signal.

BRIEF DESCRIPTION OF THE DRAWINGS

FIG. 6 illustrates a Lidar detecting a target. FIG. 7 illustrates a Lidar sensing other vehicles and surrounding conditions. FIG. 8 illustrates a Lidar sensing other vehicles and surrounding conditions while a vehicle is turning into a parking lot. FIG. 9 illustrates a Lidar sensing other vehicles and surrounding conditions while a vehicle is pulling into a parking spot between two other vehicles, while maintaining at least a predetermined distance from another vehicle which is also trying to pull into the same parking spot.

FIGS. 10-11 illustrate a vehicle driving in a lane according to a selected trajectory while a Lidar senses other vehicles and surrounding conditions of the vehicle. FIG. 12 illustrates a vehicle driving in a lane while detecting and recognizing one or more pedestrians that intend to cross a street, in accordance with various embodiments.

DETAILED DESCRIPTION

In coherent Lidar detection, in a scenario of a single modulator, a return signal reflected back from a target can only beat with a modulated signal transmitted to the target, which results in short integration time if the target is located at a long range distance. Because integration time is correlated to a level of signal acquired, detection of long-range signals using a single modulator is unfavorable. In particular, an overlap area in a region between two signals may indicate a total signal strength. Therefore, to improve the signal captured during detection of long-range targets without compromising signal captured during detection of short-range targets, a new technique implements two modulators, in which a first frequency-modulated continuous-wave (FMCW) signal is transmitted directly to a Lidar scanner while a second FMCW signal is delayed by a fixed time to a return signal, as a reference beat frequency signal.

Figure 1:
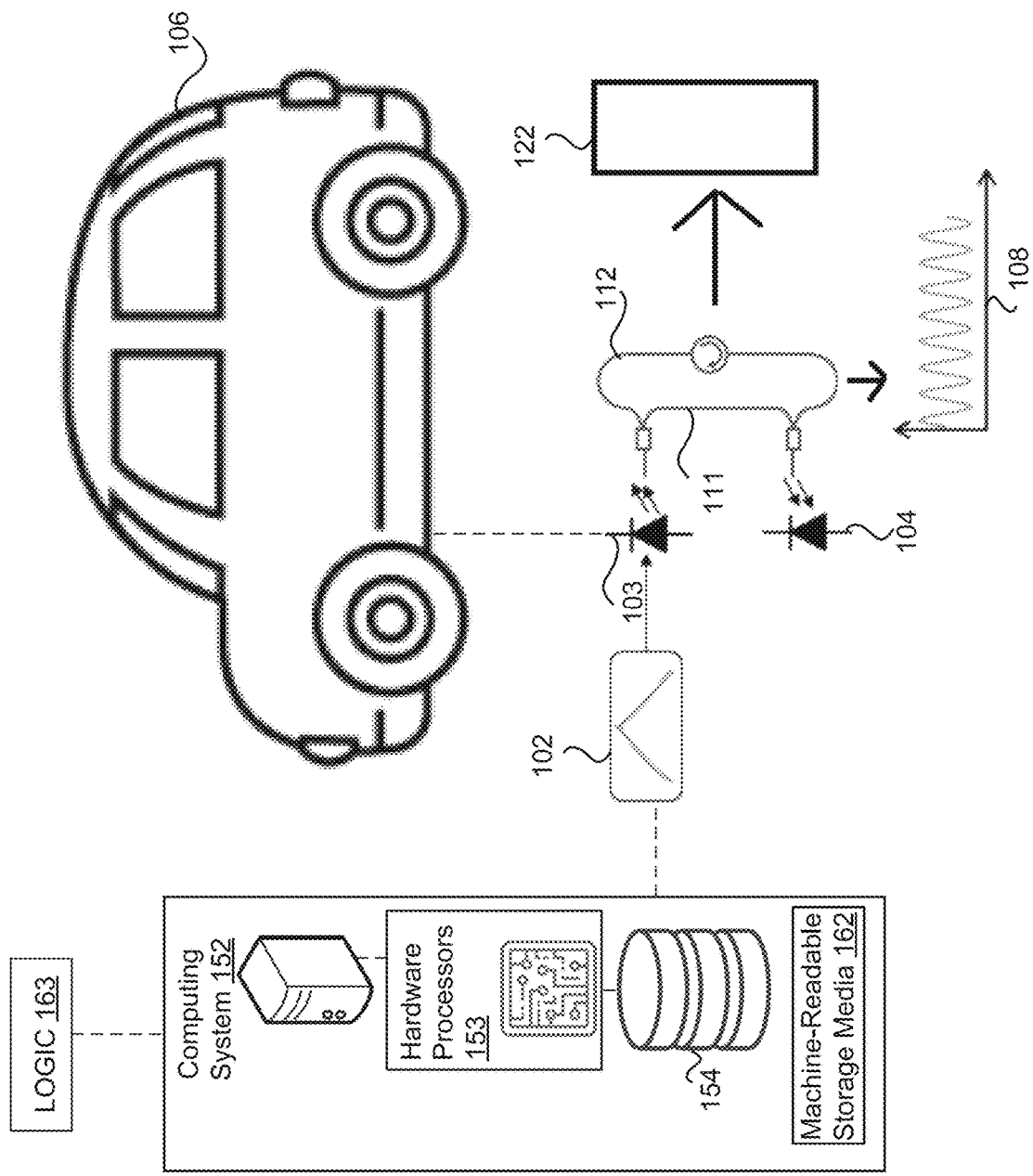
FIG. 1 illustrates an implementation of FMCW Lidar in which a laser source, following application of an input voltage, is directed to two separate paths, a reference path as a local oscillator, and a probe path towards a target, in accordance with various embodiments.

FIG. 1 illustrates an implementation of FMCW Lidar in which a laser source 103, following application of an input voltage 102, is directed to two separate paths, a reference path 111 as a local oscillator, and a probe path 112 towards a target 122. The laser source 103 may be a linear frequency modulated chirped laser. A photodetector 104 may detect an interference signal of light between the probe path 112 and the reference path 111, which may be manifested as a beat signal 108. The beat signal 108 may be sinusoidal and a frequency of the beat signal may be proportional to a distance to the target. The laser source 103 may be part of a Lidar, which may be disposed on a moving object, such as a vehicle. For example, at least one of the Lidar or the target 122 may be moving. In some examples, a maximum relative velocity between the Lidar and the target 122 may be approximately 300 kilometers per hour, in which both the Lidar and the target 122 are moving in opposite directions at approximately 150 kilometers per hour. In another example, either the Lidar or the target 122 may be approximately stationary and one of the Lidar or the target 122 may be moving at approximately 150 kilometers per hour. A range of relative velocities may be between 150 kilometers per hour and 300 kilometers per hour.

The Lidar may be associated with a computing system 152 which includes one or more processors and memory. Processors can be configured to perform various operations by interpreting machine-readable instructions, for example, from a machine-readable storage media 162. The processors can include one or more hardware processors 153. In some examples, one or more of the hardware processors 153 may be combined or integrated into a single processor, and some or all functions performed by one or more of the hardware processors 153 may not be spatially separated, but instead may be performed by a common processor. The hardware processors 153 may further be connected to, include, or be embedded with logic 163 which, for example, may include protocol that is executed to carry out the functions of the hardware processors 153. These functions may include any of those described in the foregoing figures, such as FIGS. 2-13. The one or more hardware processors 153 may also be associated with storage 154, which may encompass a permanent storage or cache to store any outputs or intermediate outputs from the hardware processors 153.

Figure 2:
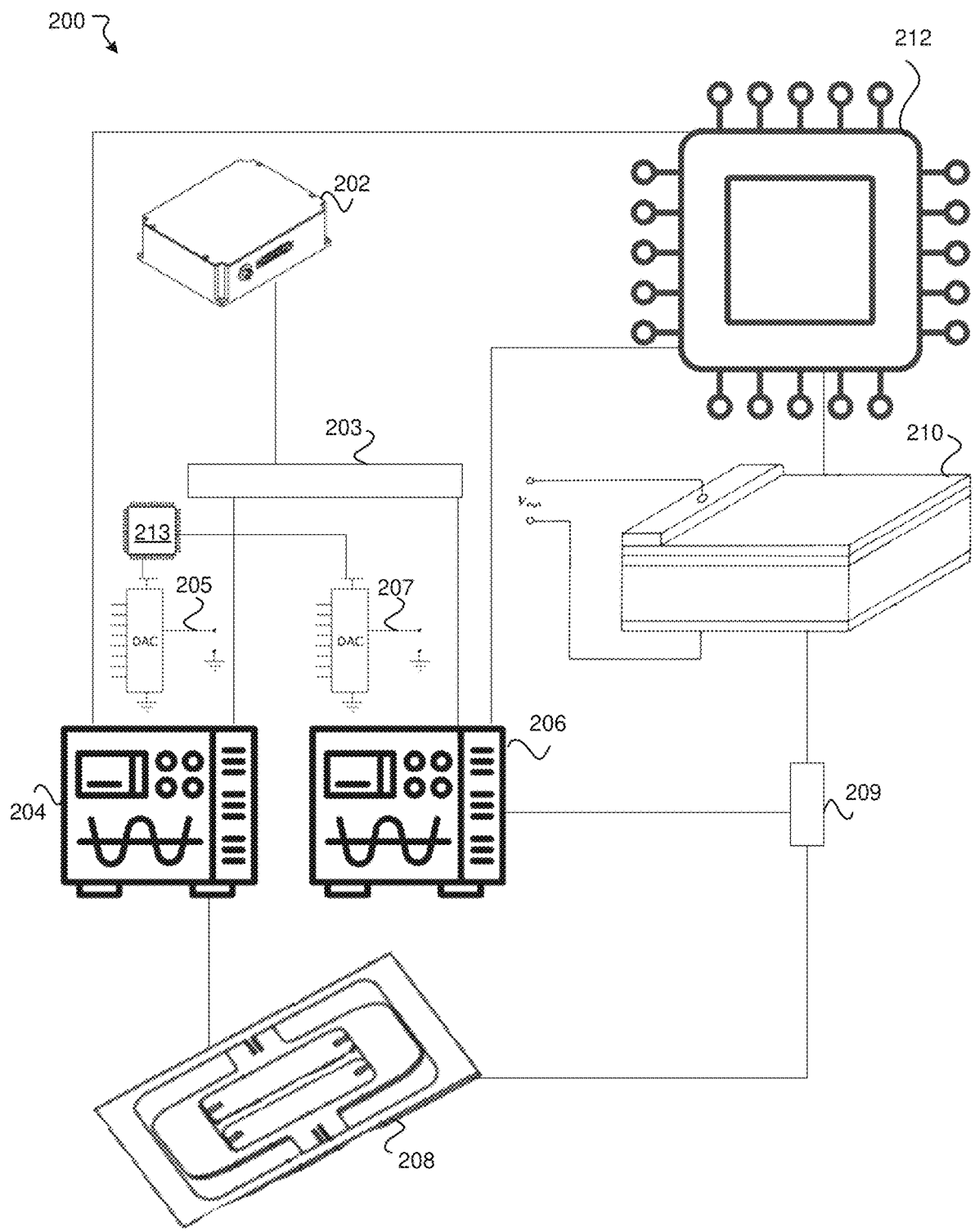
FIG. 2 illustrates an implementation of a Lidar system that includes a laser source, a splitter, digital-to-analog converters (DACs), modulators corresponding to the DACs, a scanner, a coupler, a detector, and a processor, in accordance with various embodiments.

FIG. 2 illustrates a schematic implementation of a Lidar system that includes a laser source 202, a splitter 203, a digital-to-analog converter (DAC) 205, a DAC 207, a modulator 204 corresponding to the DAC 205, a modulator 206 corresponding to the DAC 207, a scanner 208, a coupler 209, a detector 210, and a processor 212. The processor 212 may generate a first FMCW signal for optical signal modulation and a second signal, corresponding to, and after sampling, the return optical signal detected by the detector 210. The laser source 202 may generate an optical signal, which may be divided into two paths using a splitter 203, and may be modulated with the two FMCW signals generated by the processor 212 at the modulators 204 and 206. The modulator 204 may modulate the optical signal with the first FMCW signal while the modulator 206 may modulate the optical signal with the second FMCW signal. The DAC 205 may control the modulator 204 while the DAC 207 may control the modulator 206. The DACs 205 and 207 may be controlled by a field-programmable gate array (FPGA) 213. The optical signal modulated with the first FMCW signal may be transmitted to the scanner 208 first while the optical signal modulated with the second FMCW signal may be transmitted directly to the coupler 209. The optical signal modulated with the first FMCW signal may then be transmitted to the coupler 209 following transmission to the scanner 208. The two signals transmitted to the coupler 209 are then transmitted to the detector 210 for beating, or detecting of a beat note. Thus, the modulator 204 is utilized for modulating and transmitting while the modulator 206 may be utilized for beating with a received signal, thereby improving integration time for long-range return signals and improving signal-to-noise ratio of long-range signals. By implementing two modulators, the return signal can beat with the second FMCW signal, rather than the first FMCW signal, resulting in a short integration time for close-range objects and a long integration time for long-range objects. Even for close-range objects, due to stronger signals, even a short integration time may sufficiently detect and recognize a target. Thus, short integration time for close-range objects is likely not detrimental.

Figure 3:
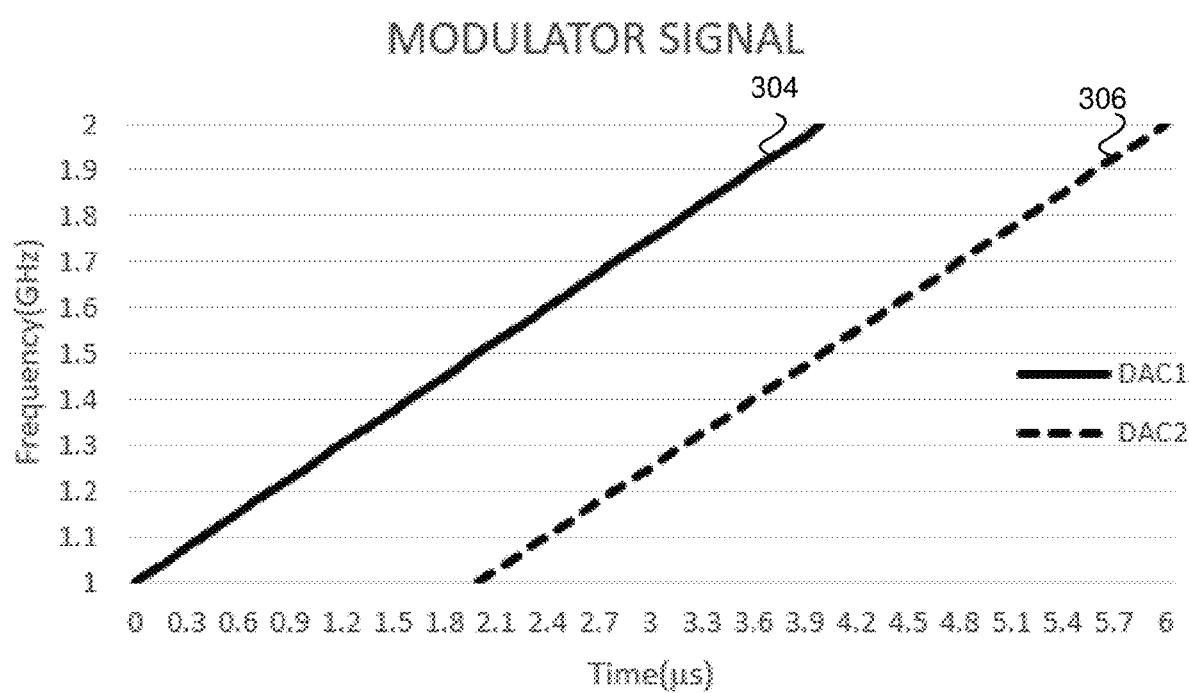
FIG. 3 illustrates two fixed delay sweep signals, generated using FPGA, and controlling of two DACs in accordance with various embodiments.
Figure 4:
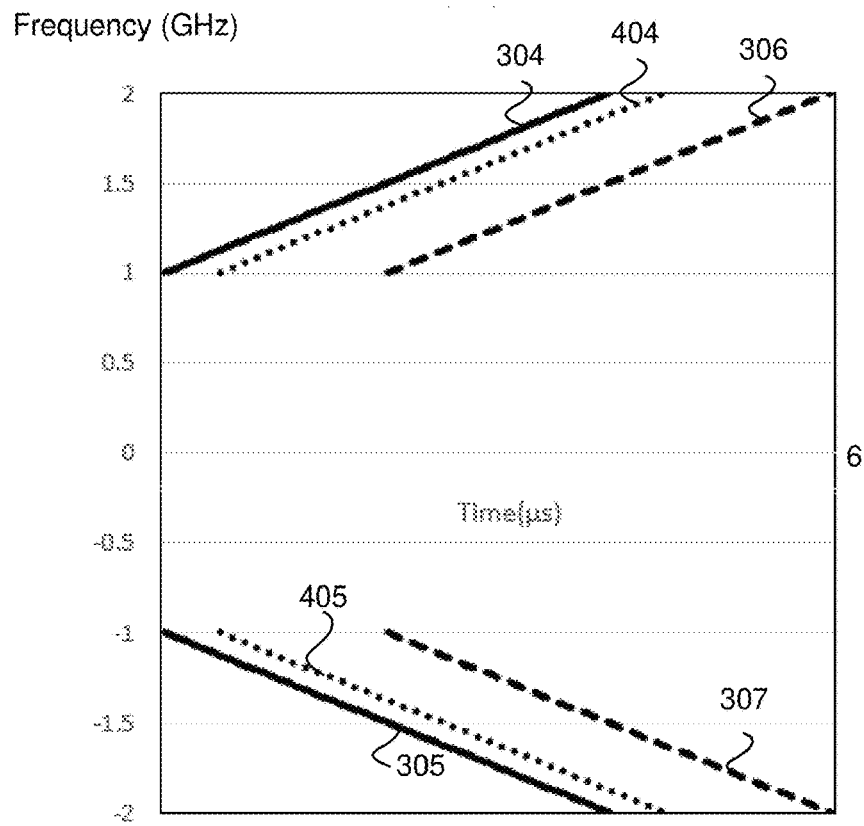
FIG. 4 illustrates two fixed delay sweep signals when a target is at close range, in accordance with various embodiments.
Figure 5:
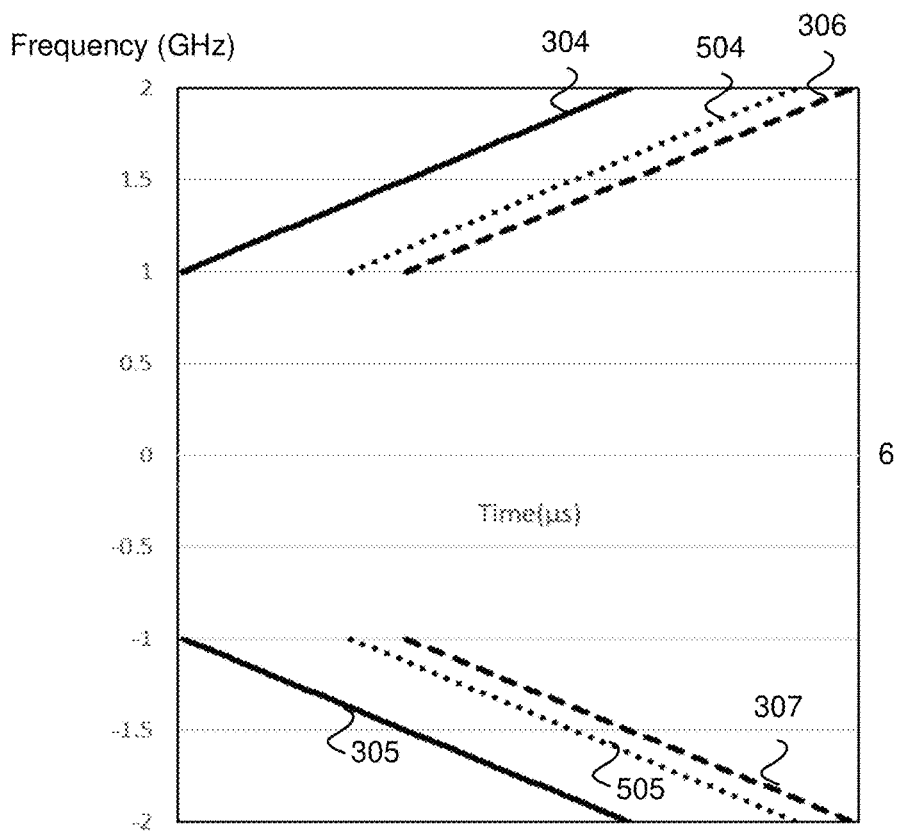
FIG. 5 illustrates two fixed delay sweep signals when a target is at long range, in accordance with various embodiments.

FIG. 3 illustrates two fixed delay sweep signals 304 and 306, generated using FPGA (e.g., the FPGA 213) controlling of two DACs (e.g., the DACs 205 and 207), in accordance with the implementation of FIG. 2. The delay may be a digital electronic delay which is programmable on the FPGA. The sweep signal 304 represents a reference signal that is delayed by a fixed time and/or synchronized with the return signal. The sweep signal 306 illustrates a transmitted signal. FIG. 4 illustrates two fixed delay sweep signals when the target is at close range. In FIG. 4, the previous sweep signal 304 may be shifted to a shifted signal 404, while a previous sweep signal 305 may be shifted to a shifted signal 405. FIG. 5 illustrates two fixed delay sweep signals when the target is at long range. In FIG. 5, the previous sweep signal 304 may be shifted to a shifted signal 504, while a previous sweep signal 305 may be shifted to a shifted signal 505. In FIG. 5, an overlap time between the sweep signal 306 and the shifted signal 504 and the sweep signal 306 may be longer than that in FIG. 4, thus increasing the integration time. In each of FIGS. 3-5, the two sweep signals have same slope magnitudes. At shorter distances, beat frequencies will be larger.

Figure 6:
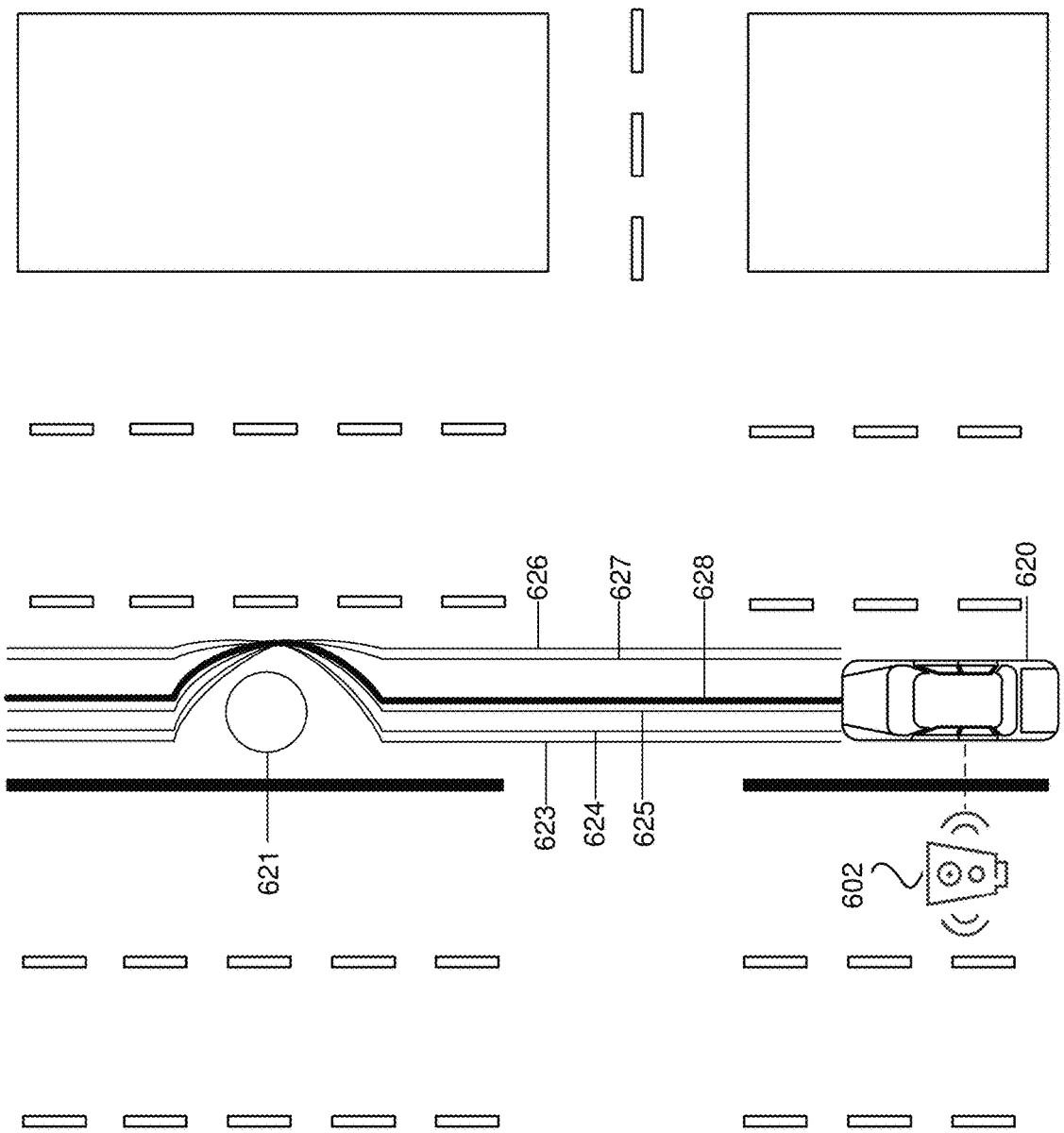
FIGS. 6-12 illustrate navigation scenarios, in which a Lidar capturing one or more targets at increased signal strength is augmented with navigation.

FIGS. 6-12 illustrate navigation scenarios, in which capturing one or more targets at increased signal strength may be augmented with navigation. In FIG. 6, a Lidar 602 (e.g., which may encompass the laser source 103), that is associated with and/or on a vehicle 620, may detect a target such as an obstacle 621, such as a pothole, bump, or rock on a road, using any of the techniques illustrated with respect to FIGS. 1-5. The hardware processors 153 may determine a driving action or maneuver of the vehicle 620 in order to pass or avoid the obstacle 621. The determined driving action or maneuver of the vehicle 620 may be based on a size and location of the obstacle 621 and/or a predicted location when the vehicle 620 traverses the obstacle 621. In some examples, the hardware processors 153 may determine that the obstacle 621 is too large and/or too dangerous for the vehicle 620 to pass without swerving, or to straddle. For example, the hardware processors 153 may predict that if the vehicle 620 attempts to directly drive over the obstacle 621 without swerving, one or more wheels of the vehicle 620 may hit the obstacle 621 and cause the previously stationary obstacle 621 to roll to another adjacent lane or to an opposite side of the road, thereby increasing a danger to another vehicle on the adjacent lane or the opposite side of the road. The hardware processors 153 may predict a change in trajectory of the another vehicle on the adjacent lane or the opposite side of the road as a result of the obstacle 621 rolling. The hardware processors 153 may further predict a change in trajectory of the vehicle 620 itself as a result of hitting the obstacle 621, such as a change in a velocity, acceleration, pose, orientation, and/or equilibrium of the vehicle 620. If the hardware processors 153 predict that the change in the trajectory of the vehicle 620, after hitting the obstacle 621, exceeds an allowable range, or that the change in the trajectory of the another vehicle exceeds an allowable range, the hardware processors 153 may determine that the vehicle 620 should swerve to avoid the obstacle 621. The hardware processors 153 may adjust a trajectory of the vehicle 620 to avoid the obstacle 621. The hardware processors 153 may select from potential trajectories 623, 624, 625, 626, 627, and 628. The potential trajectories 623, 624, 625, 626, 627, and 628 may be based on historical data of previous trajectories in similar conditions determined by size of obstacle, traffic density, road conditions, lighting conditions, and/or weather conditions. For example, the potential trajectories 623, 624, 625, 626, 627, and 628 may be determined based on a recent driving history of the vehicle 620. The potential trajectories 623, 624, 625, 626, 627, and 628 may be recent actual trajectories, for example, during a past year, month, or week, that have highest safety metrics. The hardware processors 153 may select the trajectory 628, based on predicted impacts to the trajectory 628, to a trajectory of the obstacle 621, and to a trajectory of another nearby vehicle that may be affected by the obstacle 621. For example, the hardware processors 153 may predict that the vehicle 620, while following the trajectory 628, will not hit the obstacle 621, and thus, the obstacle 621 will not change its trajectory and remain stationary. The hardware processors 153 may cause the vehicle 620 to navigate or maneuver past the obstacle 621 along the trajectory 628. After following the trajectory 628, the hardware processors 153 may determine an actual impact on the trajectory 628, the trajectory of the obstacle 621, and the trajectory of the nearby vehicle. Thus, if the hardware processors 153 determine that the vehicle 620 actually hit the obstacle 621 while following the trajectory 628, the hardware processors 153 may update or adjust the predicted impacts to the trajectory 628, to the trajectory of the obstacle 621, and to the trajectory of another nearby vehicle. The predicted impacts may be stored in a model. The updating or adjusting the predicted impacts may encompass updating the model. As a result, using the updated or adjusted predicted impacts of the updated or adjusted model, in subsequent situations, potential trajectories will place more distance between the vehicle 620 and the obstacle 621.

Figure 7:
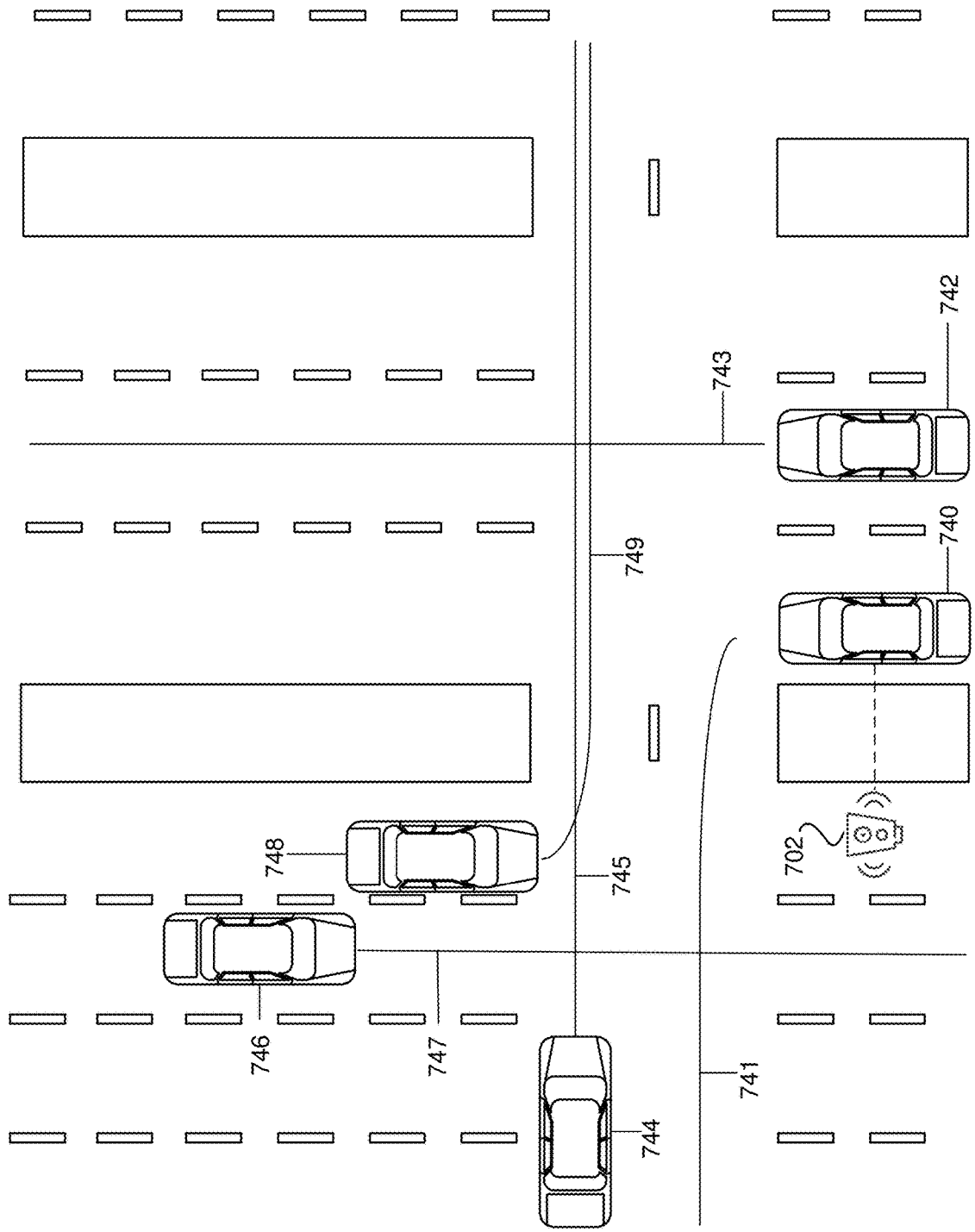

In FIG. 7, hardware processors (e.g., the hardware processors 153) associated with a Lidar 702 (e.g., which may encompass the laser source 103), of a vehicle 740 may sense other vehicles 742, 744, 746, and 748 in an environment using any of the aforementioned techniques described in FIGS. 1-5. The hardware processors 153 may determine a driving action or maneuver of the vehicle 740 based on the other vehicles 742, 744, 746, and 748, for example, while the vehicle 740 is attempting a left turn. The determined driving action or maneuver of the vehicle 740 may also be based on a size and location of the vehicles 742, 744, 746, and 748. The hardware processors 153 may predict trajectories 743, 745, 747, and 749 of the other vehicles 742, 744, 746, and 748, respectively, based on the determined directions of motion and the velocities of the other vehicles 742, 744, 746, and 748, while predicting changes in the trajectories 743, 745, 747, and 749, as a result of the vehicle 740 following a selected trajectory 741. The hardware processors 153 may further predict a change in the selected trajectory 741 of the vehicle 740 itself, resulting from interaction with the vehicles 742, 744, 746, and 748. If the hardware processors 153 predict that the change in the trajectory of the vehicle 740 itself exceeds an allowable range, or that the change from one or more of the predicted trajectories 743, 745, 747, and 749, exceeds an allowable range, the hardware processors 153 may update the selected trajectory 741 or select another trajectory, so that the changes that fall outside respective allowable ranges are within the allowable ranges. For example, the hardware processors 153 may predict that the vehicle 740, while following the trajectory 741, will maintain at least a predetermined distance from each of the predicted trajectories 743, 745, 747, and 749, without causing any of the vehicles 742, 744, 746, and 748 to slow down by more than an acceptable amount, or to deviate from each of the respective predicted trajectories 743, 745, 747, and 749. After following the trajectory 741, the hardware processors 153 may determine an actual change or impact on the selected trajectory 741, and actual changes or impacts to the predicted trajectories 743, 745, 747, and 749. If the hardware processors 153 determine that at least one of the actual trajectories of the vehicles 742, 744, 746, and/or 748 deviate from the predicted trajectories 743, 745, 747, and 749, respectively, or that at least one of the vehicles 742, 744, 746, and 748 decrease their respective velocities by more than an acceptable amount, the hardware processors 153 may update or adjust the predicted trajectories 743, 745, 747, and 749, or a predicted impact on the predicted trajectories 743, 745, 747, and 749. The predicted trajectories 743, 745, 747, and 749 may be stored in a model. The updating or adjusting the predicted trajectories 743, 745, 747, and 749 or predicted impacts on the predicted trajectories 743, 745, 747, and 749 may encompass updating the model. For example, if the hardware processors 153 determine that the trajectory 741 approaches too closely to one or the predicted trajectories, such as the predicted trajectory 743, so that the vehicle 742 must swerve, a result of this interaction may be stored in the model. The model may be updated so that next time, a selected trajectory will not approach too closely to one of the predicted trajectories. As a result, using the updated or adjusted predicted impacts of the updated or adjusted model, potential trajectories in subsequent interactions will place more distance between the vehicle 740 and predicted trajectories.

Figure 8:
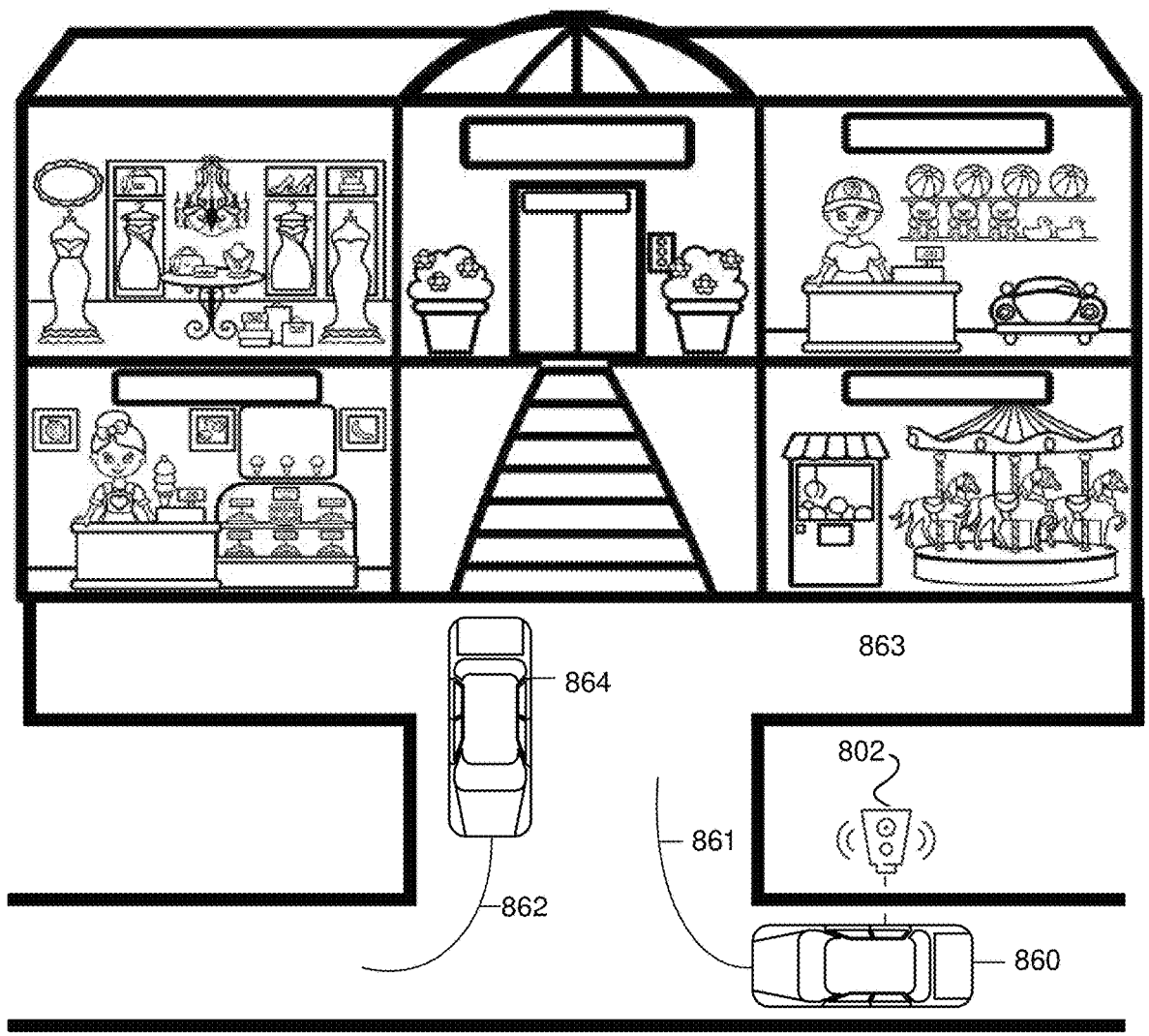

In FIG. 8, a computing system (e.g., the computing system 152, including the hardware processors 153) of a vehicle 860, and associated with a Lidar 802 (e.g., which may encompass the laser source 103), of a vehicle 860, may sense other vehicles and surrounding conditions while the vehicle 860 is turning into a parking lot 863, using any of the aforementioned techniques described in FIGS. 1-5. In some examples, an entrance to the parking lot 863 may not include clear lane dividers to separate vehicles entering the parking lot 863 and vehicles such as a vehicle 864 leaving the parking lot 863. In such examples, the hardware processors 153 may select a trajectory, such as a trajectory 861, for the vehicle 860 to follow as the vehicle 860 pulls into the parking lot 863, based on the detected vehicle 864. For example, the trajectory 861 may be one-quarter of the way from one side (e.g., a right side) of the entrance and three-quarters of the way from an opposing side (e.g., a left side) of the entrance, so that enough room may be left for the vehicle 864 that is also leaving the parking lot 863 at a same time from an opposite side, as represented by a predicted trajectory 862. The hardware processors 153 may determine a driving action or maneuver of the vehicle 860 in order to account for the vehicle 864. The determined driving action or maneuver of the vehicle 860 may be based on a size and location of the vehicle 864. The hardware processors 153 may predict the trajectory 862, and predict a change in the trajectory 862, as a result of the vehicle 860 following the selected trajectory 861. The hardware processors 153 may further predict a change in the selected trajectory 861 of the vehicle 860 itself, resulting from interaction with the vehicle 864. If the hardware processors 153 predicts that the change in the trajectory of the vehicle 860 itself exceeds an allowable range, or that the change from the predicted trajectory 862 exceeds an allowable range, the hardware processors 153 may update the selected trajectory 861 or select another trajectory, so that the changes that fall outside respective allowable ranges are within the allowable ranges. For example, the hardware processors 153 may predict that the vehicle 860, while following the trajectory 861, will maintain at least a predetermined distance from the predicted trajectory 862, without causing the vehicle 864 to slow down by more than an acceptable amount, or to deviate from the predicted trajectory 862. After following the trajectory 861, the hardware processors 153 may determine an actual change or impact to the trajectory 861, and an actual change or impact to the predicted trajectory 862 of the vehicle 864. If the hardware processors 153 determine that the actual trajectory of the vehicle 864 deviates from the predicted trajectory 862, or that the vehicle 864 decreases its velocity by more than an acceptable amount, the hardware processors 153 may update or adjust the predicted trajectory 862, or a predicted impact on the predicted trajectory 862 as a result of the vehicle 860 following the trajectory 861. The predicted trajectory 862 may be stored in a model. The updating or adjusting the predicted trajectory 862 and predicted impacts on the predicted trajectory 862 may encompass updating the model. For example, if the hardware processors 153 determine that the trajectory 861 approaches too closely to the predicted trajectory 862, such that the vehicle 864 actually swerves to avoid the vehicle 860, a result of this interaction may be stored in the model. The model may be updated so that next time, a selected trajectory of the vehicle 860 will not approach too closely to a predicted trajectory. As a result, using the updated or adjusted predicted impacts of the updated or adjusted model, potential trajectories in subsequent interactions will place more distance between the vehicle 860 and predicted trajectories.

Figure 9:
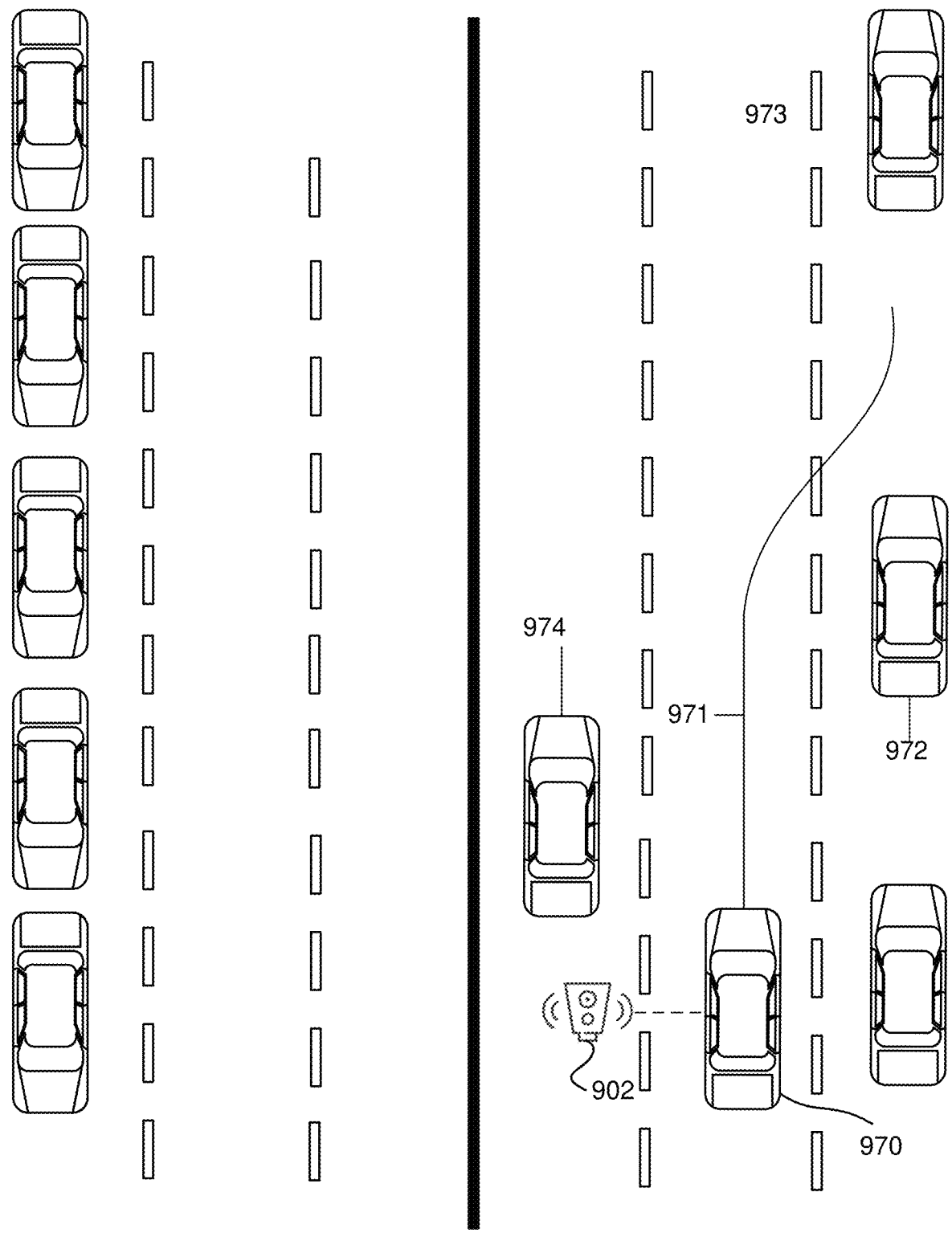

In FIG. 9, a computing system (e.g., the computing system 152, including the hardware processors 153) of a vehicle 970, and associated with a Lidar 902 (e.g., which may encompass the laser source 103), may sense other vehicles and surrounding conditions while the vehicle 970 is pulling into a parking spot between vehicles 972 and 973, while maintaining at least a predetermined distance from a vehicle 974 which may currently be driving and also trying to pull into the same parking spot. The hardware processors 153 may sense, detect, or capture the vehicle 974 using any of the aforementioned techniques described in FIGS. 1-5. The hardware processors 153 may determine whether or not to compete with another vehicle such as the vehicle 974 for a common parking spot, based on relative positions of the vehicle 970 and 974 and a predicted trajectory of the vehicle 974, including a velocity, acceleration, and pose of the vehicle 974. If the hardware processors 153 determine to try to obtain the parking spot, the hardware processors 153 may select a trajectory 971. If the vehicle 970 is either unsuccessful in obtaining the parking spot, or a distance between the vehicle 971 and the vehicle 974 becomes lower than a threshold distance while both the vehicle 971 and the vehicle 974 are trying to obtain the parking spot, the hardware processors 153 may store data of and a result of an interaction between the vehicle 971 and the vehicle 974 in a model, so that the vehicle 970 can refine its decision making process in a similar future situation when the vehicle 970 is attempting to pull into a parking spot.

Figure 10:
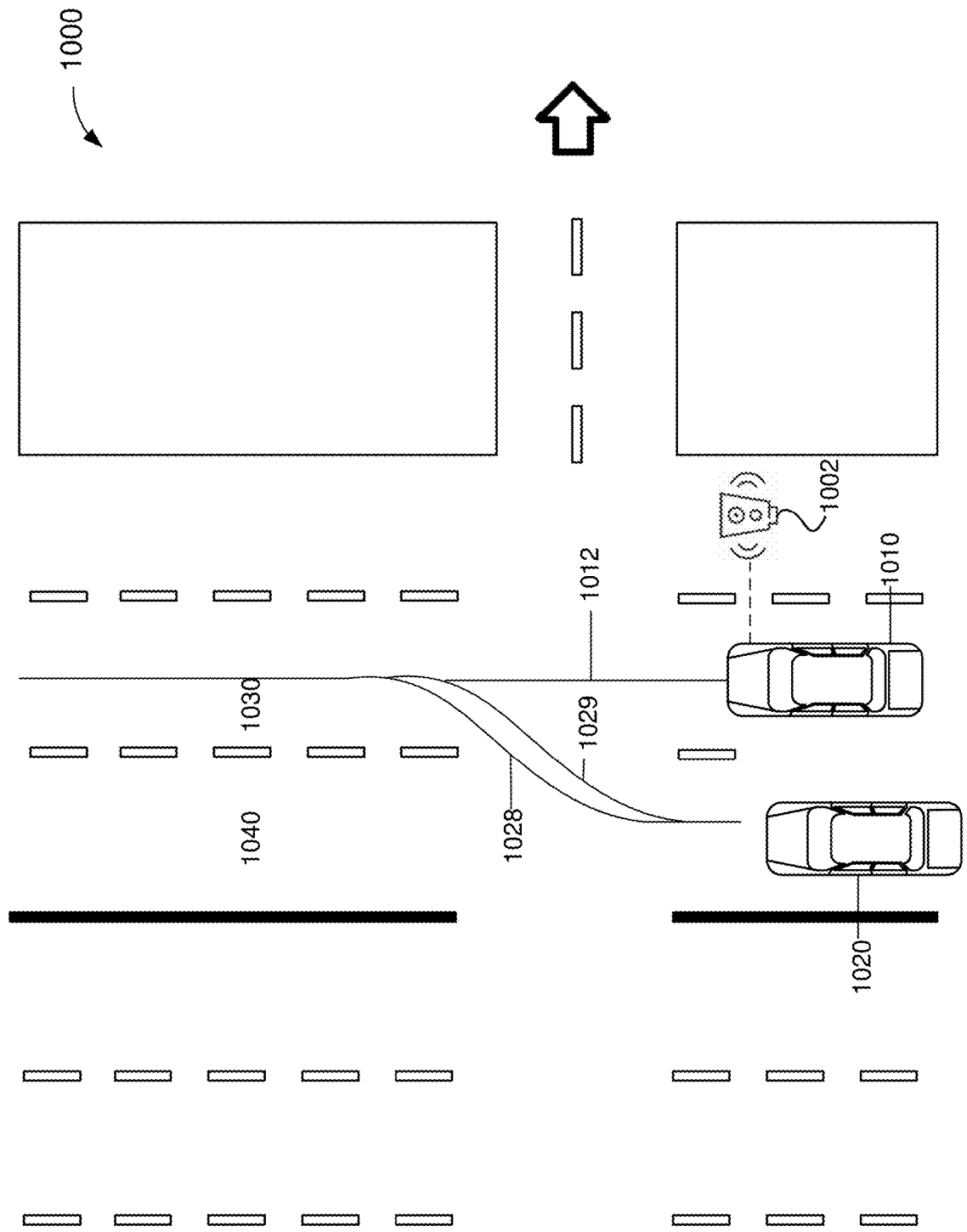
Figure 10:
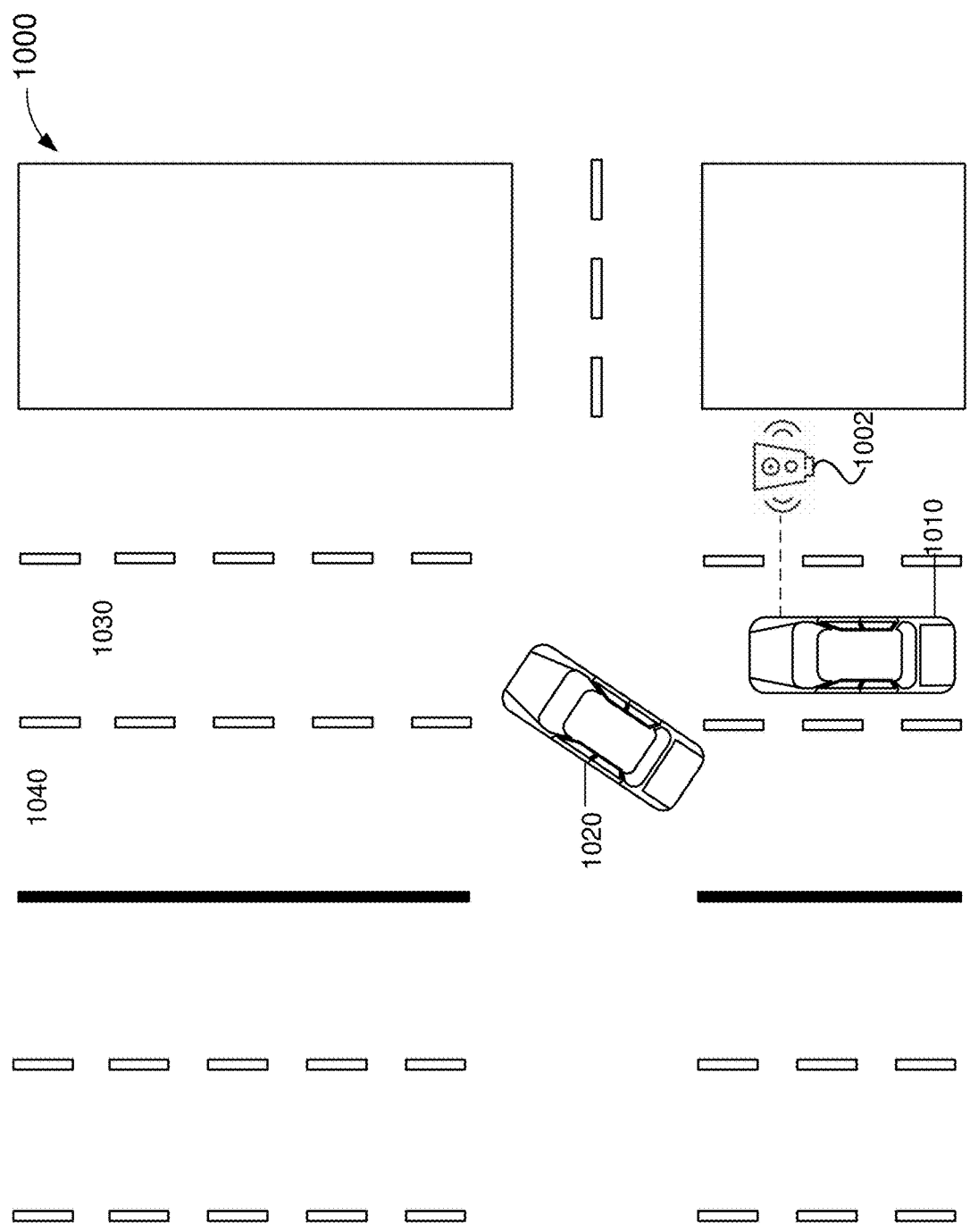

In FIG. 10, a vehicle 1010 may be driving in a lane 1030 according to a selected trajectory 1012. Another vehicle 1020, which may be an AV, may be driving in a lane 1040 to a left side of the vehicle 1010. A computing system (e.g., the computing system 152, including the hardware processors 153) of the vehicle 1010, and associated with a Lidar 1002 (e.g., which may encompass the laser source 103), may sense other vehicles and surrounding conditions of the vehicle 1010 to determine and/or perform a navigation action. The another vehicle 1020 may signal to the vehicle 1010 that the another vehicle 1020 intends to pass or overtake the vehicle 1010 and merge into the lane 1030. The vehicle 1010 may detect and recognize, via one or more hardware processors (e.g., the hardware processors 153), that the another vehicle 1020 intends to merge into the lane 1030. The sensing, detecting, and/or capturing of the vehicle 1020 and its intention to merge may be according to any of the aforementioned techniques described in FIGS. 1-5. The hardware processors 153 may determine whether or not to allow the another vehicle 1020 to merge into the lane 1030. The determination may comprise predicting a trajectory 1028 of the another vehicle 1020 and a predicted change in the selected trajectory 1012 of the vehicle 1010, as a result of the vehicle 1010 allowing the another vehicle 1020 to merge into the lane 1030. For example, if a predicted change in the selected trajectory 1012 exceeds an allowable amount, the hardware processors 153 may not allow the another vehicle 1020 to merge into the lane 1030. For instance, a predicted change in the selected trajectory 1012 may comprise a predicted decrease in velocity of the vehicle 1010. If the vehicle 1010 allows the another vehicle 1020 to merge into the lane 1030, the hardware processors 153 may determine an actual change in the selected trajectory 1012 resulting from the merging of the another vehicle 1020, and determine an actual trajectory of the another vehicle 1020 during merging. If the actual change in the selected trajectory 1012 deviates from the predicted change in the selected trajectory 1012 by more than a threshold amount, if the actual change in the selected trajectory 1012 exceeds the allowable amount, or if the actual trajectory of the another vehicle 1020 during merging deviates from the predicted trajectory 1028, the hardware processors 153 may update or adjust the predicted trajectory 1028, or a predicted impact on the selected trajectory 1012, as a result of the vehicle 1010 following the trajectory 1012. The predicted trajectory 1028, and the predicted impact on the selected trajectory 1012, may be stored in a model. The updating or adjusting the predicted trajectory 1028 and predicted impact on the selected trajectory 1012 may encompass updating the model. For example, if the hardware processors 153 determine that the another vehicle 1020 follows an actual trajectory 1029, such that the vehicle 1010 must slow down by more than the allowable amount to keep a predetermined distance with the another vehicle 1020, a result of this interaction may be stored in the model. The model may be updated so that next time, the vehicle 1010 may be less likely to allow the another vehicle to merge into the lane 1030. Likewise, as the vehicle 1010 transmits updates to the model to other vehicles in a fleet or network, the other vehicles may also adjust their behaviors so they are less likely to try to merge in such situations.

Figure 11:
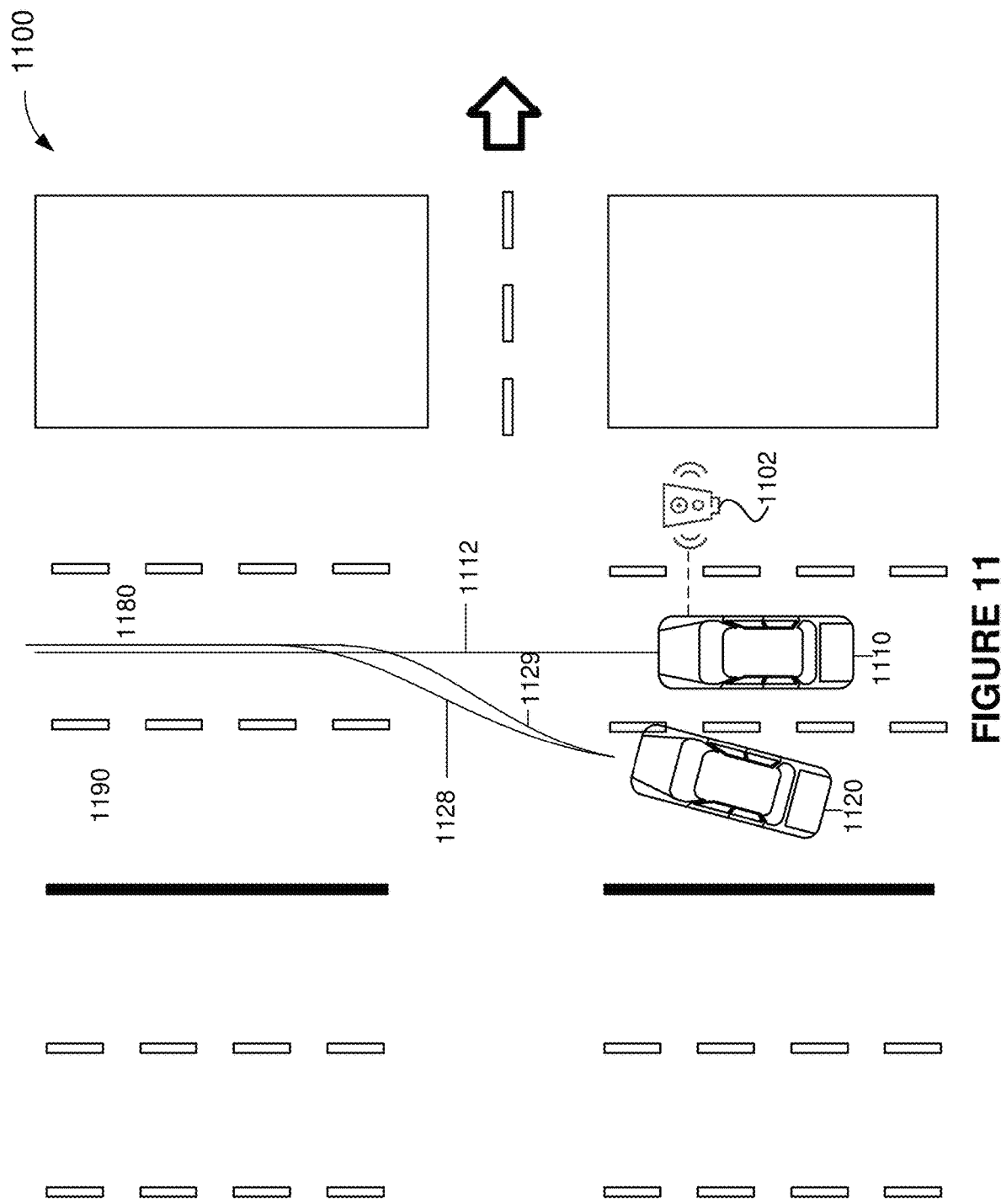
Figure 11:
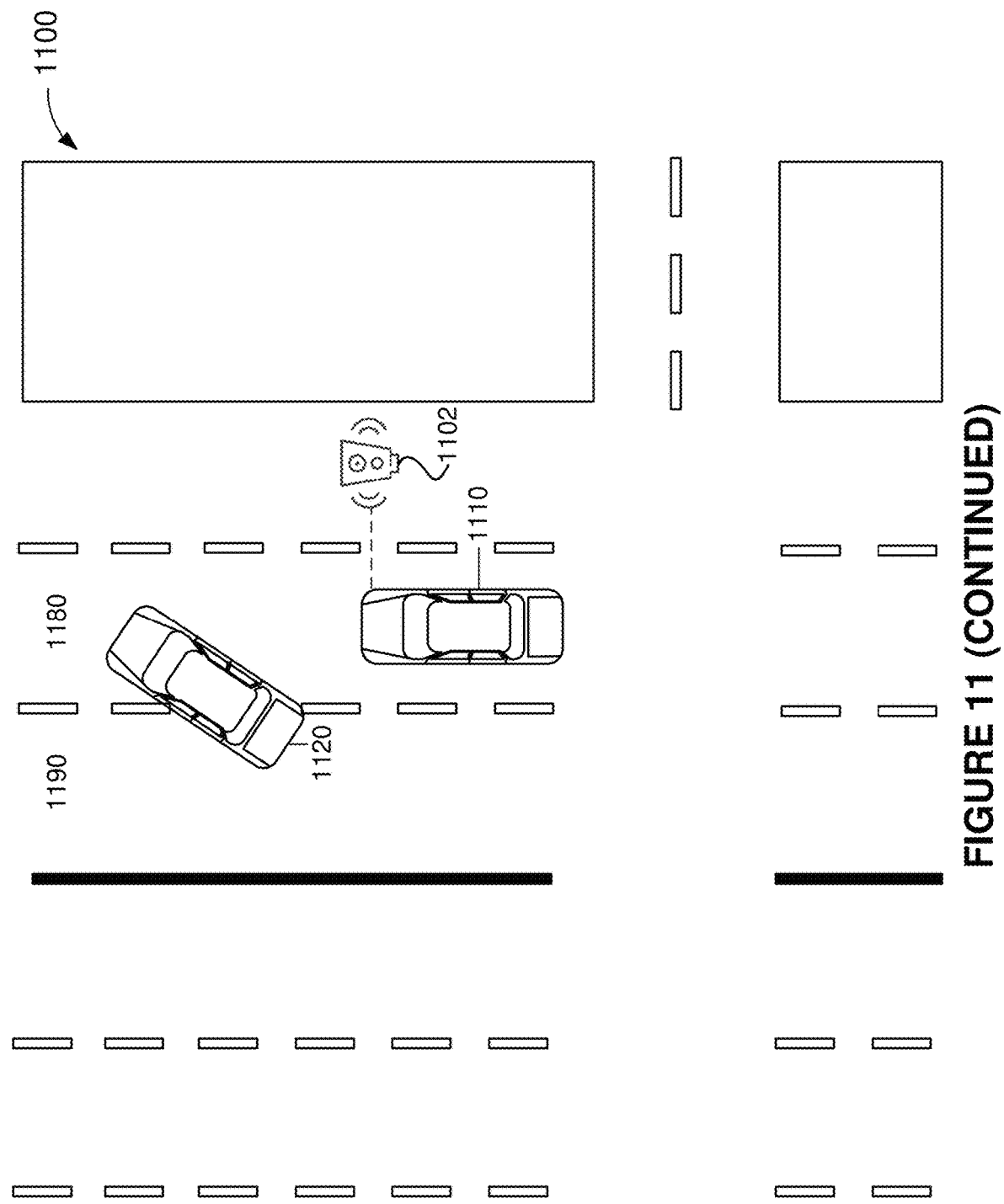

In FIG. 11, a vehicle 1110 may be driving in a lane 1180, according to a selected trajectory 1112. A computing system (e.g., the computing system 152, including the hardware processors 153) of the vehicle 1110, and associated with a Lidar 1102 (e.g., which may encompass the laser source 103), may sense other vehicles and surrounding conditions of the vehicle 1110 to determine and/or perform a navigation action. Another vehicle 1120, which may be an AV, may be driving in a lane 1190 to a left side of the vehicle 1110. The another vehicle 1120 may urgently be attempting to merge into the lane 1180 without properly signaling to the vehicle 1110, that the another vehicle 1120 intends to pass or overtake the vehicle 1110 and merge into the lane 1180. The vehicle 1110 may detect and recognize, via the hardware processors 153, that the another vehicle 1120 intends to merge into the lane 1180. The hardware processors 153 may detect, capture, and/or sense the another vehicle 1120 and its attempt or intent to merge according to any of the aforementioned techniques described in FIGS. 1-5, predict a trajectory of the another vehicle 1120, and/or infer or predict any point at which the another vehicle 1120 intends to merge into the lane 1180. The hardware processors 153 may determine whether or not to permit the another vehicle 1120 to merge into the lane 1180 by slowing down, or to speed up in order to move in front of the another vehicle 1120. The determination may comprise predicting a trajectory 1128 of the another vehicle 1120 and a predicted change in the selected trajectory 1112 of the vehicle 1110, as a result of the vehicle 1110 allowing the another vehicle 1120 to merge into the lane 1180, or as a result of speeding up. For example, if a predicted change in the selected trajectory 1112 exceeds an allowable amount, as a result of allowing the another vehicle 1120 to merge into the lane 1180, the hardware processors 153 may determine not to allow the another vehicle 1120 to merge into the lane 1180. For instance, a predicted change in the selected trajectory 1112 may comprise a predicted decrease in velocity of the vehicle 1110. If the vehicle 1110 allows the another vehicle 1120 to merge into the lane 1180, the hardware processors 153 may determine an actual change in the selected trajectory 1112 resulting from the merging of the another vehicle 1120, and determine an actual trajectory of the another vehicle 1120 during merging. If the actual change in the selected trajectory 1112 deviates from the predicted change in the selected trajectory 1112 by more than a threshold amount, if the actual change in the selected trajectory 1112 exceeds the allowable amount, or if the actual trajectory of the another vehicle 1120 during merging deviates from the predicted trajectory 1128, the hardware processors 153 may update or adjust the predicted trajectory 1128, or a predicted impact on the selected trajectory 1112, as a result of the vehicle 1110 following the trajectory 1112. The predicted trajectory 1128, and the predicted impact on the selected trajectory 1112, may be stored in a model. The updating or adjusting the predicted trajectory 1128 and predicted impact on the selected trajectory 1112 may encompass updating the model. For example, if the hardware processors 153 determine that the another vehicle 1120 follows an actual trajectory 1129, such that the vehicle 1110 must slow down by more than the allowable amount to keep a predetermined distance with the another vehicle 1120, a result of this interaction may be stored in the model. The model may be updated so that next time, the vehicle 1110 may be less likely to allow the another vehicle to merge into the lane 1130 so that the vehicle 1110 instead will speed up to pull in front of another vehicle attempting to merge into a lane without signaling. Likewise, as the vehicle 1110 transmits updates to the model to other vehicles in a fleet or network, the other vehicles may also adjust their behaviors so they are less likely to try to merge in such situations.

Figure 12:
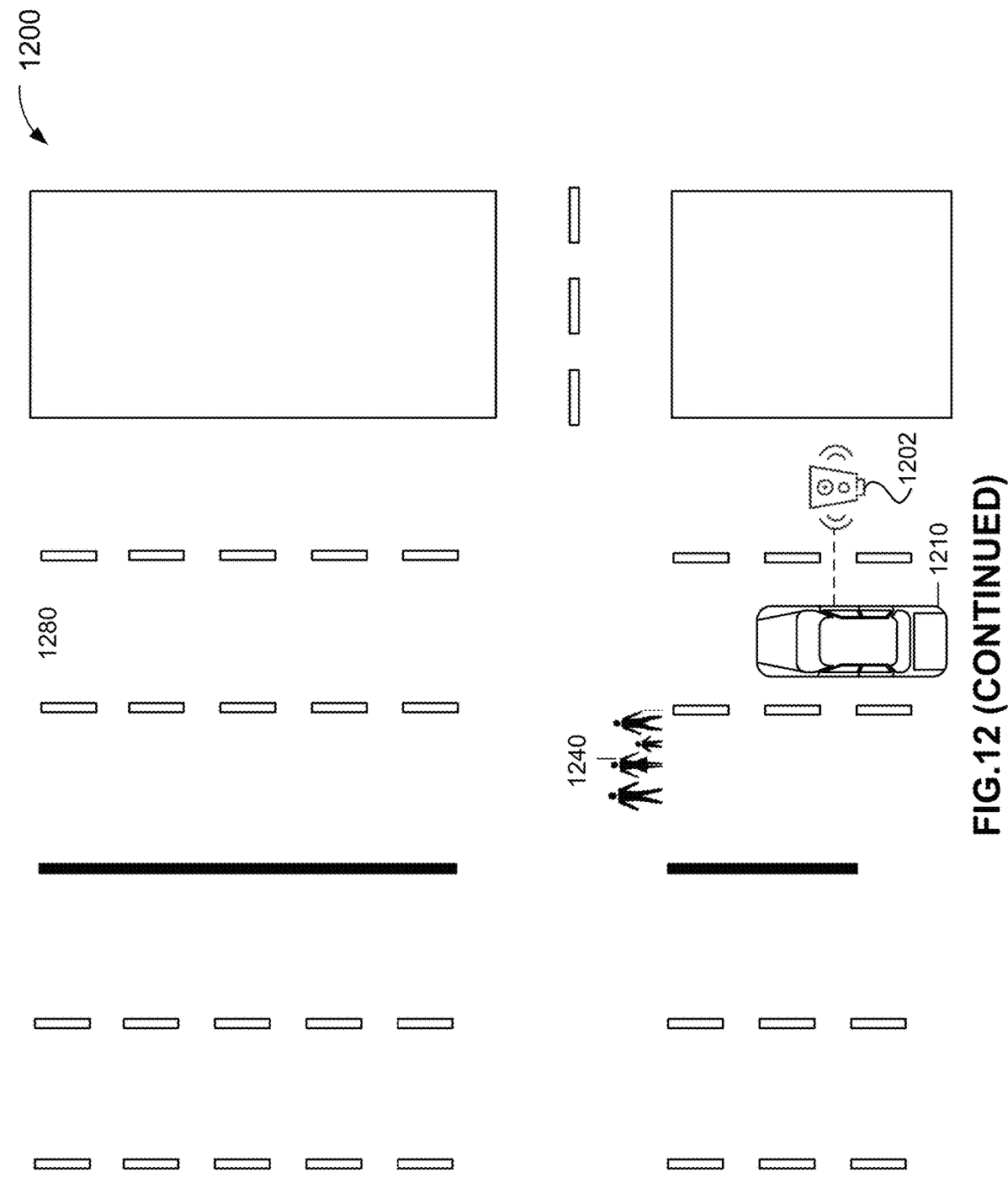

In FIG. 12, a vehicle 1210 may be driving in a lane 1280. The vehicle 1210 may detect and recognize, via the hardware processors 153, one or more pedestrians 1240 that intend to cross a street, accordingly to any of the aforementioned techniques of FIGS. 1-5. The hardware processors 153 of the vehicle 1210, and associated with a Lidar 1202 (e.g., which may encompass the laser source 103), may sense other vehicles and surrounding conditions of the vehicle 1210 to determine and/or perform a navigation action. The vehicle 1210 may determine or predict a moving direction and a velocity of the pedestrians 1240, individually and/or collectively, predict a trajectory of the pedestrians 1240 based on the moving direction or the velocity, and predict a delay time as a result of yielding to the pedestrians 1240. After the pedestrians 1240 have finished crossing the street, the hardware processors 153 may determine an actual delay time as a result of yielding to the pedestrians 1240. If the actual delay time deviates from the predicted delay time by more than a threshold amount, the hardware processors 153 may update the predicted delay time to account for the deviation, and incorporate the updated predicted delay time in future measurements.

Figure 13:
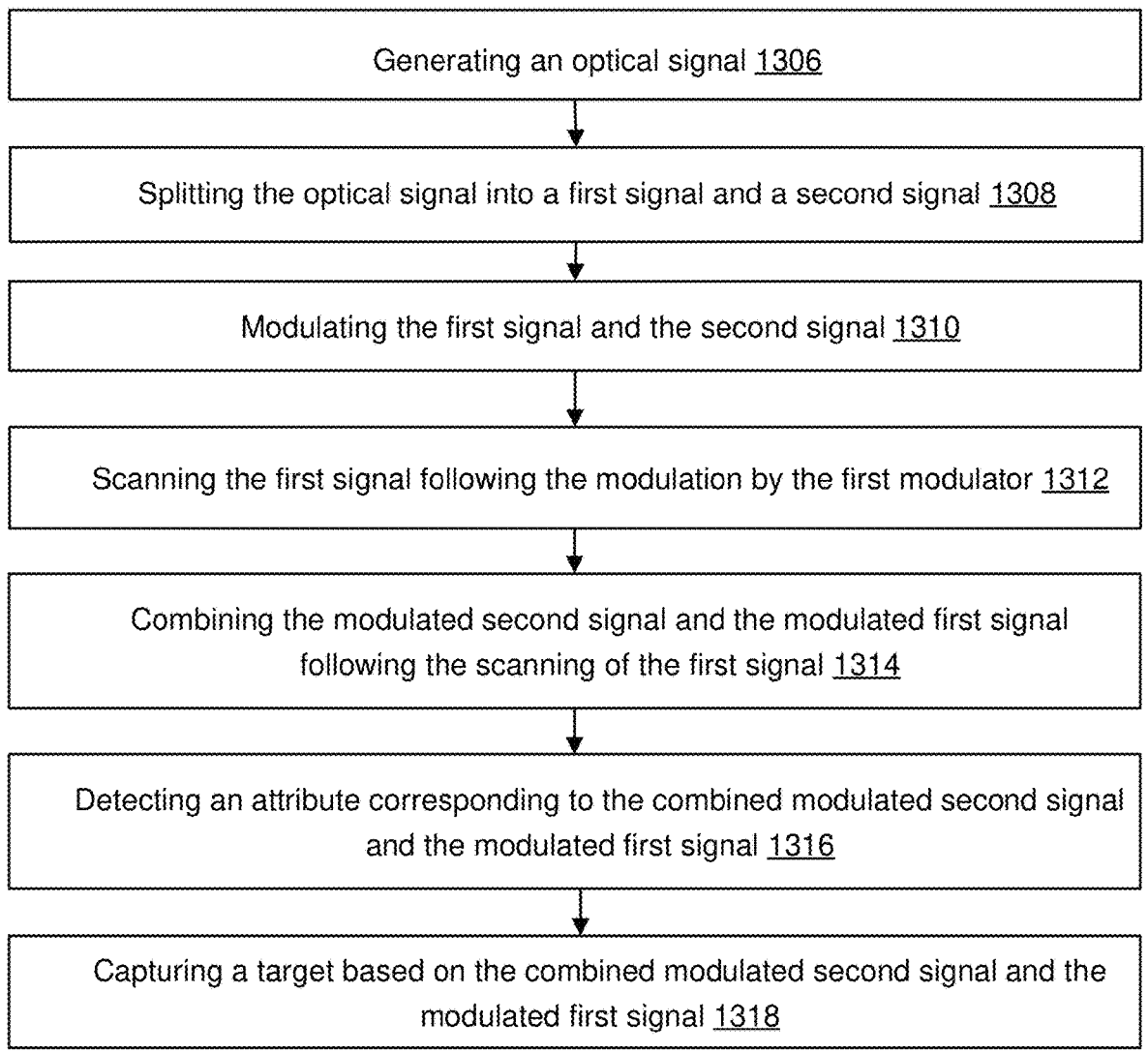
FIG. 13 illustrates a method consistent with the previous implementations of FIGS. 1-12, in accordance with various embodiments.

FIG. 13 illustrates a method in accordance with any of the previous FIGS. 1-12.

At step 1306, a laser source (e.g., of, or associated with, a Lidar, such as the Lidar 102) may generate an optical signal, which may include a light signal.

In step 1308, a splitter (e.g., the splitter 203) may split the optical signal into a first signal and a second signal, which are transmitted across separate paths (e.g., a first path and a second path). The first path may traverse the modulator 204, and the second path may traverse the modulator 206. The modulator 204 may modulate the first signal while the modulator 206 may modulate the second signal, in step 1310. The modulator 204 may modulate the first signal using a first modulation signal, such as a frequency modulated continuous wave (FMCW) signal generated by the processor 212. Likewise, the modulator 206 may modulate the second signal using a second modulation signal, such as a FMCW signal generated by the processor 212.

In step 1312, the first signal, following the modulation by the modulator 204, may be scanned by the scanner 208. Meanwhile, the second signal, following the modulation by the modulator 206, may be transmitted directly to the coupler 209, without passing through the scanner 208. The second signal may be delayed by a fixed time, with respect to a return optical signal, as a reference beat frequency signal. In step 1314, the coupler 209 may combine the modulated second signal and the modulated and scanned first signal. The received signal and the other modulated signal may be transmitted together into the coupler 209 and transmitted to the detector 210, which may detect a reference beat frequency signal.

In step 1316, the detector 210 may detect an attribute corresponding to the combined modulated second signal and the modulated first signal, such as a beat frequency. In step 1318, the detector 210 may capture a target based on the modulated second signal and the modulated first signal. In particular, this dual-modulated signal may increase integration time, which corresponds to a time range of overlap between the modulated second signal and the modulated first signal. This captured target may be further processed, for example, by the processor 212. A navigation action, for example, of a vehicle (e.g., the vehicle 106) may be determined based on this captured target, scenarios of which are illustrated in FIGS. 6-12.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 14:
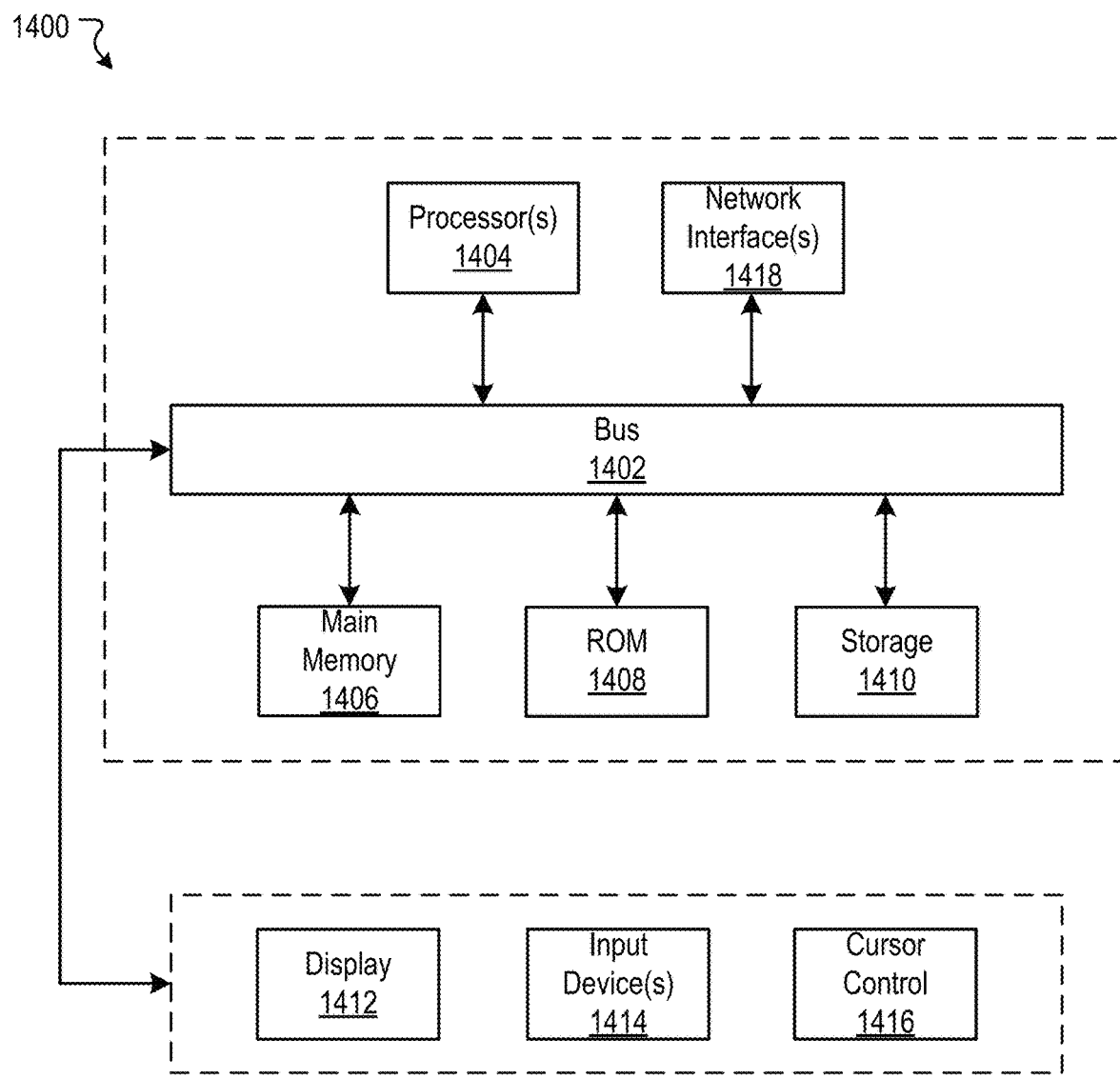
FIG. 14 illustrates a block diagram of an example computer system in which any of the embodiments described herein may be implemented.

FIG. 14 is a block diagram that illustrates a computer system 1400 upon which any of the embodiments described herein may be implemented. In some examples, the computer system 1400 may include a cloud-based or remote computing system. For example, the computer system 1400 may include a cluster of machines orchestrated as a parallel processing infrastructure. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a cathode ray tube (CRT) or LCD display (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may retrieves and executes the instructions. The instructions received by main memory 1406 may optionally be stored on storage device 1410 either before or after execution by processor 1404.

The computer system 1400 also includes a communication interface 1418 coupled to bus 1402. Communication interface 1418 provides a two-way data communication coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network(s), network link and communication interface 1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A system, comprising:
a laser source configured to generate an optical signal;
a splitter configured to split the optical signal into a first signal and a second signal;
a first modulator configured to modulate the first signal;
a second modulator configured to modulate the second signal;
a scanner that scans the first signal following the modulation by the first modulator;
a coupler that combines the modulated second signal and the modulated first signal following the scanning of the first signal; and
a detector configured to detect an attribute corresponding to the combined modulated second signal and the modulated first signal, and capture a target based on the combined modulated second signal and the modulated first signal.

2. The system of claim 1, further comprising a processor that generates a first frequency modulated continuous wave (FMCW) signal and a second FMCW signal to modulate the first signal and the second signal, respectively.

3. The system of claim 2, wherein the processor processes the captured target, and determines and executes a navigation action based on the processed target.

4. The system of claim 3, wherein the navigation action comprises a yielding, a swerving, or a turning action.

5. The system of claim 2, wherein the second FMCW signal has a delay with respect to the first FMCW signal, and the processor controls a magnitude of the delay.

6. The system of claim 5, wherein the processor controls the magnitude of the delay based on a distance from the processor to the target.

7. The system of claim 5, wherein the processor controls the magnitude of the delay to be higher in response to a smaller distance from the processor to the target.

8. The system of claim 2, wherein the second FMCW signal comprises a reference beat signal that beats with a signal reflected from the target.

9. The system of claim 1, further comprising a first digital-to-analog converter (DAC) that controls the first modulator and a second DAC that controls the second modulator.

10. The system of claim 9, further comprising a field programmable gate array (FPGA) that controls the first DAC and the second DAC.

11. A method comprising:
generating an optical signal;
splitting the optical signal into a first signal and a second signal;
modulating the first signal;
modulating the second signal;
scanning the first signal following the modulation by the first modulator;
combining the modulated second signal and the modulated first signal following the scanning of the first signal;
detecting an attribute corresponding to the combined modulated second signal and the modulated first signal; and
capturing a target based on the combined modulated second signal and the modulated first signal.

12. The method of claim 11, further comprising generating a first frequency modulated continuous wave (FMCW) signal and a second FMCW signal to modulate the first signal and the second signal, respectively.

13. The method of claim 12, further comprising processing the captured target; and
determining and executing a navigation action based on the processed target.

14. The method of claim 13, wherein the navigation action comprises a yielding, a swerving, or a turning action.

15. The method of claim 12, further comprising controlling a magnitude of the delay of the second FMCW signal with respect to the first FMCW signal.

16. The method of claim 15, further comprising controlling the magnitude of the delay based on a distance from the processor to the target.

17. The method of claim 15, further comprising controlling the magnitude of the delay to be higher in response to a smaller distance from the processor to the target.

18. The method of claim 12, wherein the second FMCW signal comprises a reference beat signal that beats with a signal reflected from the target.

19. The method of claim 12, further comprising controlling the first modulator using a first DAC and controlling the second modulator using a second DAC.

20. The method of claim 19, further comprising controlling the first DAC and the second DAC using a field programmable gate array (FPGA).

* * * * *